(12) United States Patent
Kashyap

(10) Patent No.: US 8,132,314 B2
(45) Date of Patent: Mar. 13, 2012

(54) METHOD AND SYSTEM FOR PACKAGING AND MOUNTING SURFACE ACOUSTIC WAVE SENSOR ELEMENTS TO A FLEX PLATE

(75) Inventor: Pavan Ramachandravitthal Kashyap, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 540 days.

(21) Appl. No.: 12/260,261

(22) Filed: Oct. 29, 2008

(65) Prior Publication Data

US 2010/0102670 A1 Apr. 29, 2010

(51) Int. Cl.
*H04R 31/00* (2006.01)

(52) U.S. Cl. ............ 29/594; 29/609.1; 29/739; 29/742; 310/348; 310/340; 310/344; 257/E21.499; 438/51

(58) Field of Classification Search .................. 29/592.1, 29/594, 609.1, 729, 739, 742, 831, 832, 842, 29/846, 854, 858, 883; 310/313, 340, 344, 310/348; 257/E21.499; 438/51
See application file for complete search history.

(56) References Cited

U.S. PATENT DOCUMENTS

| 6,789,297 | B2 * | 9/2004 | Takata et al. .................. 29/25.35 |
| 7,202,589 | B2 | 4/2007 | Kalinin et al. ............ 310/313 D |
| 7,389,682 | B2 | 6/2008 | JaVaherian |
| 2005/0172713 | A1 * | 8/2005 | Hosokawa et al. ............. 73/493 |
| 2007/0039200 | A1 * | 2/2007 | Hwang .......................... 34/474 |

FOREIGN PATENT DOCUMENTS

| DE | 10038450 | 2/2002 |
| EP | 1438555 B1 | 5/2005 |
| GB | 2346493 | 8/2000 |
| WO | WO00/46580 | 8/2000 |
| WO | WO03/034013 A1 | 4/2003 |
| WO | WO03/091681 A1 | 11/2003 |

OTHER PUBLICATIONS

Reindl, "Wireless Passive SAW Identification Marks and Sensors," 2002 IEEE International Frequency Control Symposium and PDA Exhibition, New Orleans, LA, USA, 115 pages, May 29-31, 2002.

* cited by examiner

*Primary Examiner* — Paul D Kim
(74) *Attorney, Agent, or Firm* — Seager Tufte & Wickhem LLC

(57) ABSTRACT

A method and system for packaging and mounting a sensor to a flex plate for use in sensing, for example, torque. In some instances, a SAW sense die can be adhesively bonded to a metal disc that includes at least one locating feature formed in the metal disc. An insulator having lead pins can be adhesively bonded to the metal disc, and may surrounds at least part of a periphery of the sense die in a particular orientation. In some instances, a cap may be bonded over the insulator. The metal disc, along with the SAW sense die, can be aligned to the flex plate by, for example, matching the at least one locating feature formed in the metal disc with at least one corresponding locating feature of a cutout in the flex plate. The aligned metal disc and the flex plate can be bonded together by, for example, laser welding.

23 Claims, 5 Drawing Sheets

METHOD AND SYSTEM FOR PACKAGING AND MOUNTING SURFACE ACOUSTIC WAVE SENSOR ELEMENTS TO A FLEX PLATE

TECHNICAL FIELD

Embodiments are generally related to sensing methods and systems. Embodiments are also related to SAW (Surface Acoustic Wave) devices and sensors. Embodiments are further related to methods for packaging and mounting SAW sensors for use with automobile flex plate applications.

BACKGROUND OF THE INVENTION

In systems that incorporate the use of rotating drive shafts, it is often necessary to have data indicative of the torque and speed of the shafts in order to control the same or other devices associated with such rotatable shafts. Accordingly, it is desirable to detect and measure torque in an accurate, reliable, and inexpensive manner. The ability to detect and measure the torque imposed on rotating shafts is a critical parameter in application such as, for example, automotive vehicles.

SAW sensors can be utilized in a variety of sensing applications, such as torque, pressure and/or temperature detection. Such sensors can be implemented, for example, by locating a SAW device on an etched diaphragm within a piezoelectric material such as, for example, quartz. In automotive vehicles, the SAW sensor package can be mounted on an automobile flex plate for sensing the torque. The flex plate, analogous to a flywheel, generally connects the torque converter to an engine crankshaft in a vehicle with an automatic transmission.

The majority of prior art SAW sensor elements are packaged in a machined steel case or a 'button' or 'pill' component. The package of a typical SAW sensor includes two parts—a base portion upon which metallic pins can be glass fritted and a flat disc that functions as a lid for the case or enclosure. Once the SAW device is placed inside the case, a wire-bonding process can electrically connect the pins to the sensor element, following which, the lid can be assembled and permanently joined to the base utilizing, for example, a laser welding process. Thereafter, the SAW sensor package can be joined to a surface of a mechanical component, whose torque is to be measured, by bonding the package to the component utilizing an adhesive or laser welding methodology.

Such an approach requires that the sensor package, along with the mechanical component, be held together for either the welding process or the adhesive curing process. Hence, fixtures and machinery are required for handling large and/or heavy mechanical components, which may increase processing costs for handling and high temperature curing, due to the presence of a larger mass. Similarly, laser welding of the button sensor package to the flex plate requires the development of an improved welding process because the two materials that are to be joined may be very different, with respect to welding. Consequently, the heat generated during a welding operation is capable of damaging the sense die and the heat-affected zone (HAZ) of the weld circle and can act as a damper with respect to the effective transfer of strain to the sensor. Also, the button is typically made of steel and constitutes a machined component, which increases production costs. A solution to these problems is to produce the button by metal injection molding; however, the change in the material properties of the material after manufacture is unknown.

Based on the foregoing, it is believed that a need exists for an improved method and/or system for packaging and mounting SAW sensor element(s) for use in a variety of applications such as, for example, automobile flex plate applications. Such an approach is described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved sensing method and system.

It is another aspect of the present invention to provide for an improved SAW torque sensor.

It is another aspect of the present invention to provide for an improved method and system for packaging and mounting a SAW sensor to an automobile flex plate for use in automotive applications.

The aforementioned aspects and other objectives and advantages can now be achieved as described herein. A method and system for packaging and mounting a SAW sensor to an automobile flex plate for sensing torque is disclosed herein. A SAW sense die can be adhesively bonded to a sheet metal disc comprising semicircular holes at the periphery of the metal disc. An insulator (e.g., plastic) comprising lead pins can be adhesively bonded to the metal disc that surrounds the sense die in a particular orientation. The lead pins can be electrically connected to the SAW die by, for example, a wire-bonding process. A cap (e.g., plastic) can be then bonded over the insulator. The metal disc along with the SAW sense die can be aligned to the flex plate by matching the semicircular holes on the metal disc with semicircular holes at the edge of a circular cutout on the flex plate. The aligned metal disc and the flex plate can be joined together by laser welding thereby providing an easier manufacturing process, together with strength, and sensitivity.

The insulator with lead pins can be attached around the SAW sense die utilizing an adhesive material to protect the sense die from external forces. The lead pins of the plastic insulator can be held in place by plastic molding and can be utilized to connect the SAW sense die to external circuitry. The semicircular holes at the periphery of the metal disc act as locators to place and orient the SAW sense die. The metal disc can be configured from the same material as that used to form the flex plate in order to eliminate the problems associated with welding of metals with dissimilar properties. The metal disc can be utilized as a base for seating the sense die and can be processed separately until it is again joined to the flex plate. Similarly, the weld circle can be located away from the sense die in order to reduce the strain reduction effect due to the heat affected zone. The SAW sensor apparatus disclosed herein can therefore be employed to detect torque and may include the use of plastic or deep drawn sheet metal parts for packaging the sensor, which in turn makes it possible for the package to be mass-produced by relatively inexpensive processes.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1A:
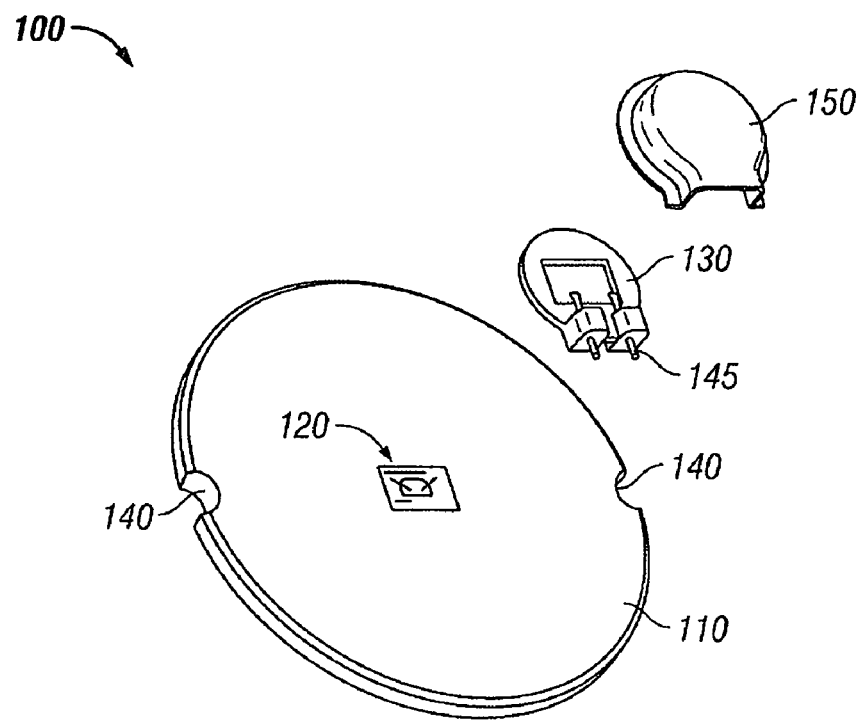
FIGS. 1A-1C illustrates a perspective view of a torque sensor apparatus that includes a SAW die bonded to a sheet metal disc, in accordance with a preferred embodiment.
Figure 1B:
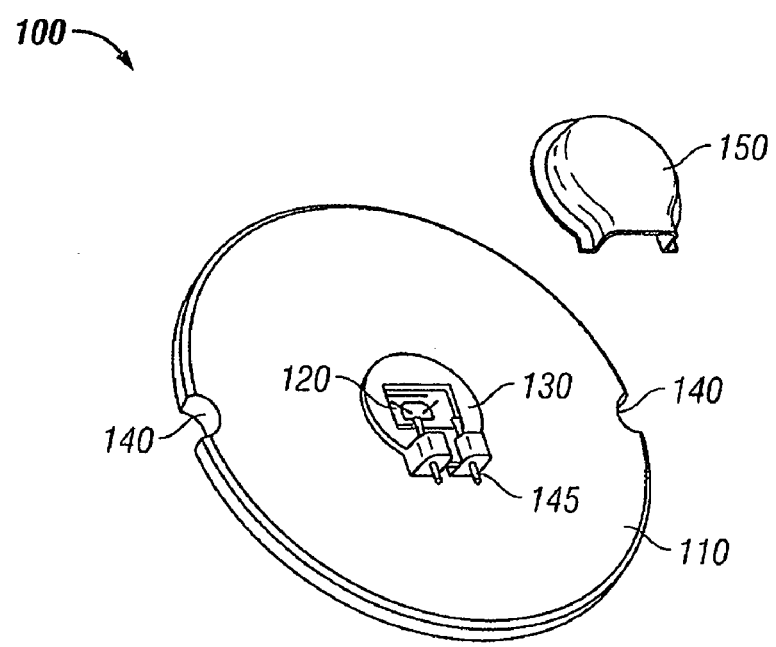
Figure 1C:
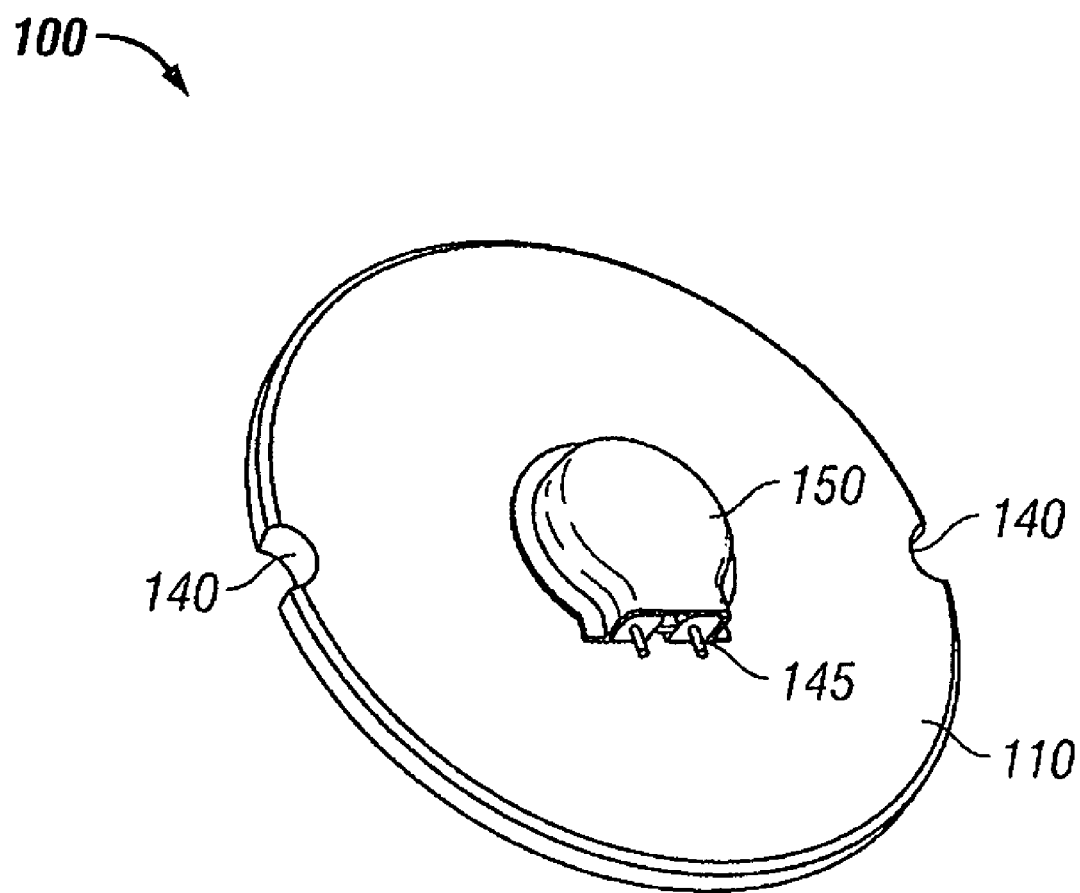

FIGS. 1A-1C illustrates a perspective view of a torque sensor apparatus 100 comprising a SAW sense die 120 bonded to a metal disc 110 by an adhesive, in accordance with a preferred embodiment. Note that in FIGS. 1-3, identical or similar blocks are generally indicated by identical reference numerals. The SAW sense die 120 can be bonded to metal disc 110, as shown in FIG. 1A. The metal disc 110 can be formed from sheet metal or another appropriate material.

The metal disc 110 further includes a number of semicircular holes 140 formed at the periphery of the metal disc 110, which act as a locator(s) to place and orient the sense die 120. An insulator 130 with lead pins 145 can be placed around the sense die 120, so that the insulator 130 surrounds the sense die 120 in a particular orientation. The insulator 130 can be bonded to the metal disc 110 utilizing an adhesive bonding, as shown in FIG. 1B. The SAW sense die 120 can be configured on the surface of, for example, the plate 110 depicted in FIG. 1A. The insulator 130 can be formed from a flexible material such as, for example, plastic or another appropriate material.

Figure 2A:
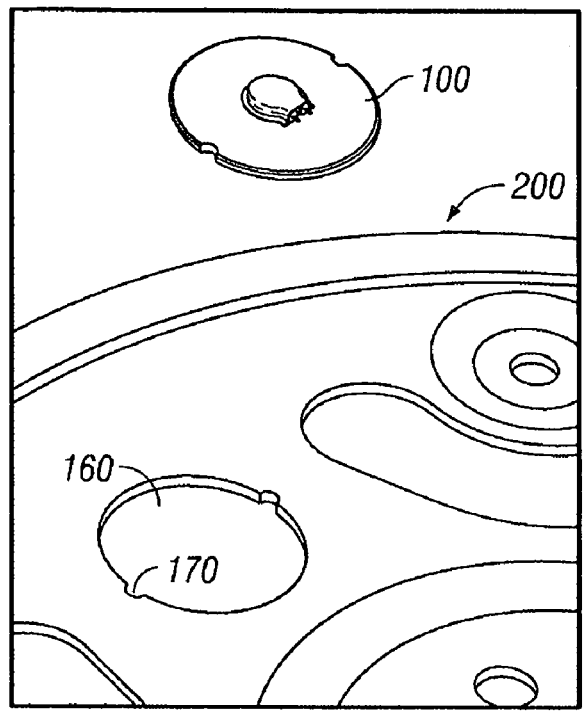
FIGS. 2A-2C illustrates a perspective view of a flex plate bonded to a torque sensor apparatus through a metal disc, in accordance with a preferred embodiment.

The insulator 130 can prevent the external forces from acting on the sense die 120. The sense die 120, along with the lead pins 145, can be utilized to carry out wire bonding for connecting the sense die 120 to external circuitry. A cap 150 can be placed over the parts of the sense die 120 for protection and the cap 150 can be bonded to the metal disc 110 utilizing an adhesive means, as depicted in FIG. 1C. The cap 150 may be configured from a material such as, for example, plastic. The plastic cap 150 can also be manufactured out of sheet metal, by deep drawing. The semicircular hole 140 on the edges of the metal disc 110 can be utilized to bond the metal disc 110 with a flex plate 200, as shown in FIG. 2A. The semicircular hole 140 can be configured to be at predetermined locations along the periphery of the disc 110 so as to orient the sense die 120 with respect to the flex plate 200.

Figure 2B:
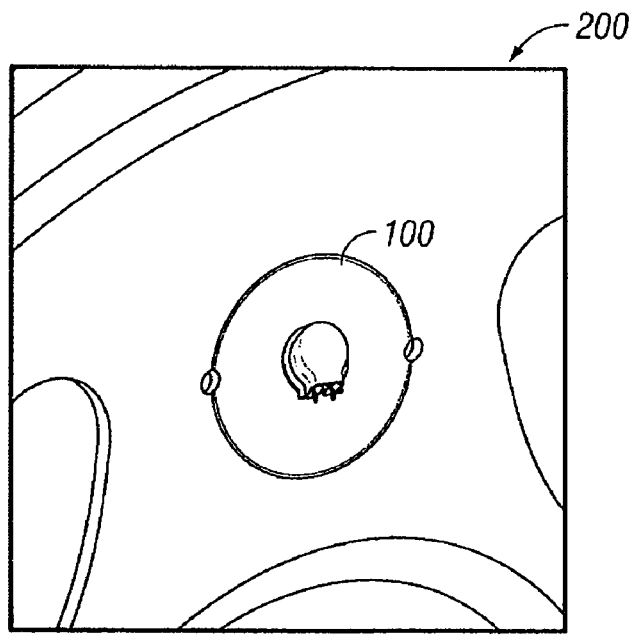
Figure 2C:
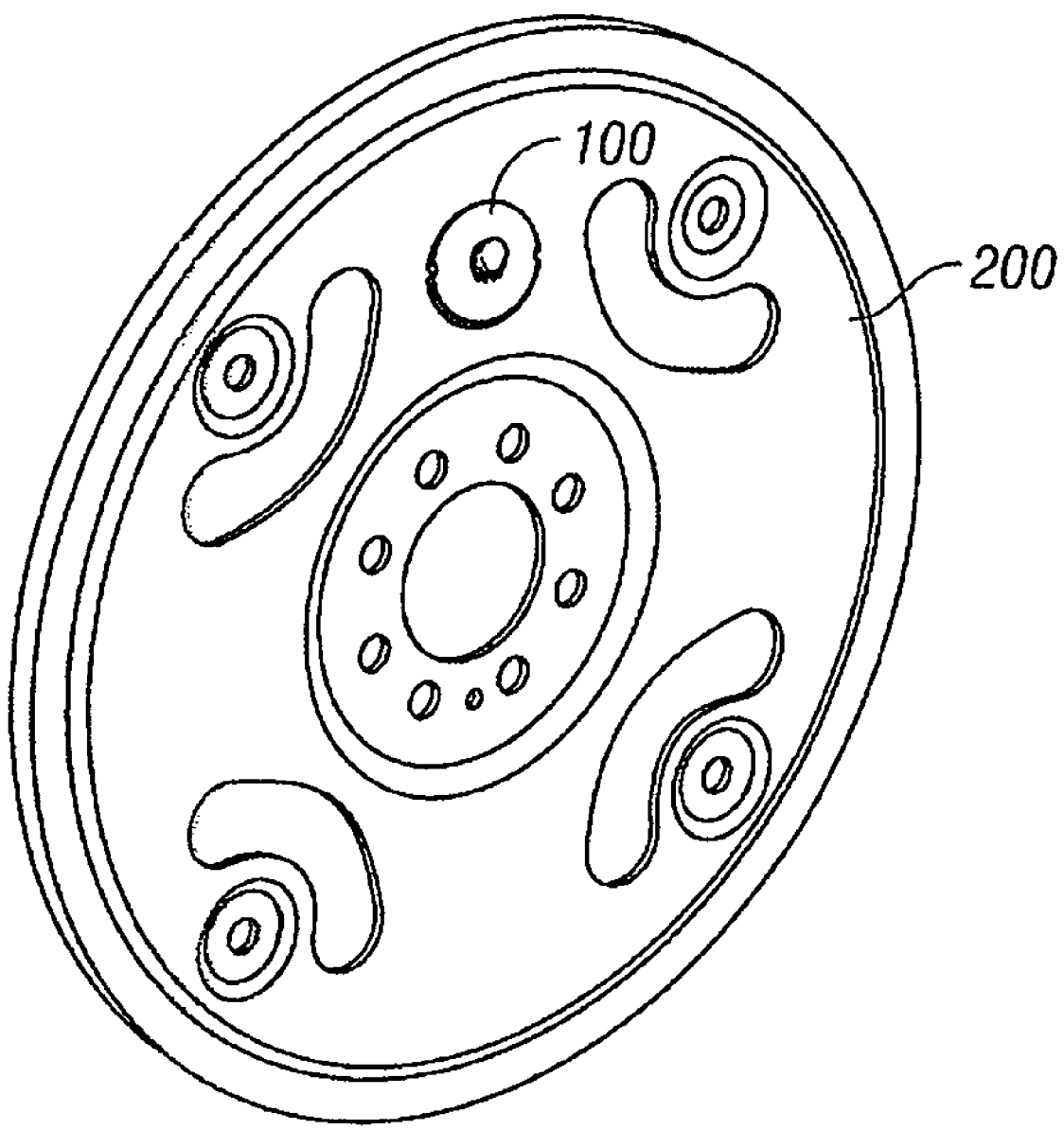

FIGS. 2A-2C illustrate a perspective view of a flex plate 200 bonded to the sense die 120 through metal disc 110, in accordance with a preferred embodiment. Although flex plate 200 is illustrated in FIGS. 2A-2C in accordance with one possible embodiment, it can be appreciated that any radial disk can be utilized to transmit torque in accordance with alternative embodiments. The flex plate 200 generally includes a circular cutout 160 formed therein. The circular cutout 160 further includes semicircular holes 170 on the edge of the cutout 160. Flex plate 200 represents an example of a flexible component that can be utilized to transmit torque, depending upon design considerations.

In understanding the purpose of flex plate 200, it is important to appreciate that flex plate 200 is based on the concept of flywheels utilized in automatic transmission engines. The flywheel for most automatic transmissions/transaxles is simply a stamped-steel starter's pinion gear. With this type of flywheel, the torque converter has no ring gear. Some automobiles, however, utilize a more modest flywheel known as a flex plate, which is all that is generally required because the torque converter itself may be configured to include a ring gear located on its outer edge. The flex plate 200 is a metal connector between the engine's crankshaft and transmission's torque converter or clutch assembly.

The flex plate 200 "flexes" to take some of the initial force from the clutch or converter and also aids in abating the vibration transferred between the two components. The semicircular holes 140 on the edge of the sheet metal disc 110 can be matched with the corresponding semicircular holes 170 at the edge of the circular cutout 160 on the flex plate 200 so that the sense die 120 can orientate with respect to the flex plate 200. Thereafter, the aligned surfaces of the sheet metal disc 110 and the flex plate 200 can be flushed and can be welded utilizing laser welding process. The laser welding is a welding technique utilized to join multiple pieces of metal where the laser can provide a concentrated heat source, allowing for narrow, deep welds and high welding rates.

The completed assembly of the flex plate 200 and the metal disc 110 can be utilized to measure the torque in automobiles. Note that the metal disc 110 and the flex plate 200 may be configured from a same material as that of the flex plate 200 to eliminate the problems associated with the welding of metals with dissimilar properties. The metal disc 110 configured from the same material as that of the flex plate 200 can be utilized as a base for seating the sense die 120 and can be processed separately till it is again joined to the flex plate 200.

The insulator 130 can be rigidly mounted to the metal disc 110 depicted in FIG. 1B. The insulator 130 flexes when a force is applied perpendicular to the surface of the metal disc 110, thereby eliminating or minimizing the effect on the sense die 120 of out-of-plane forces on the metal disc 110 and isolating the torque transferred to the metal disc 110 resulting in the transfer of only the torque applied within the plane of the metal disc 110 to the SAW die 120. The sense die 120 can be bonded directly to a portion of the flex plate 200 so that the strain transfer is direct. An adhesive can be utilized to connect the sense die 120 to the insulator 130. The insulator 130 can be constructed such that it flexes freely in the direction of the out-of-plane forces while remaining rigid in the path of the torque. The torque sensor apparatus 100 can be constructed from a thin or necked down material that will flex and, therefore, isolate when forces perpendicular to the surface of the metal disc 110 are applied while transferring force (i.e., torque) that is applied within the plane of the metal disc 110 to the SAW die 120.

Figure 3:
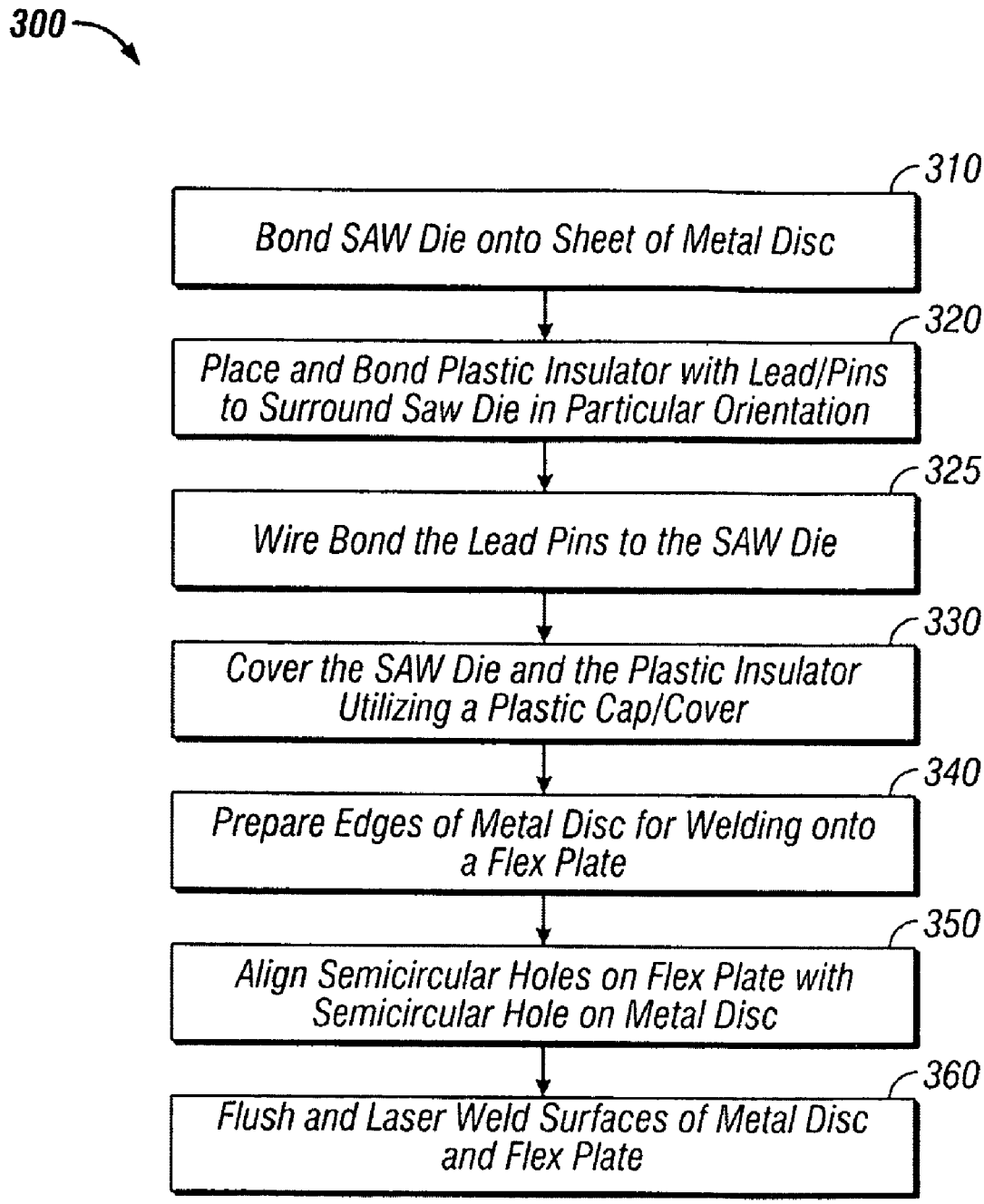
FIG. 3 illustrates a high level flow chart of operations illustrating logical operational steps of a method for packaging and mounting a torque sensor apparatus to an automobile flex plate, in accordance with a preferred embodiment.

FIG. 3 illustrates a high level flow chart of operations illustrating logical operational steps of a method 300 for packaging and mounting the SAW sensor apparatus 100 in an automobile flex plate 200, in accordance with a preferred embodiment. Again, as a reminder, in FIGS. 1-3, identical or similar elements and components are generally indicated by identical reference numerals. The sense die 120 can be bonded onto the sheet of metal disc 110, as indicated at block 310. An adhesive such as glue can be utilized to bond the sense die 120 to the metal disc 110. Thereafter, a plastic insulator 130 with lead pins 145 can be placed around the sense die 120 and can be bonded utilizing an adhesive in a particular orientation, as depicted at block 320. The plastic insulator 130 can protect the sense die 120 from the external forces. The sense die 120 and the lead pins 145 can be electrically connected by a wire bonding process. Thus, as indicated at block 325, the lead pins can be bonded to the sense die (e.g., SAW die).

The sense die 120 and the plastic insulator 135 together can be covered utilizing a plastic cap 150, as illustrated at block 330. The SAW sensor apparatus 100 with the metal disc 110 and the sense die 120 along with the plastic insulator 130 can be mounted on the flex plate 200. Next, as shown at block 340, the edges of the metal disc 110 can be prepared for welding. The semicircular holes on the metal disc 110 can be aligned correspondingly with the semicircular holes 170 on the flex plate 200, as depicted at block 350. The surfaces of the disc 110 and flex plate 200 can be made flush and welded, as illustrated at block 360. The weld circle for welding the metal disc 110 with the flex plate 200 can be located away from the sense die 120, in order to reduce strain reduction effect due to the heat of welding. Such a method 300 for packaging the sensor die 120 and mounting the sensor die 120 on the flex plate 200 utilizing a laser welding process provides a robust solution for sensing the torque in automobiles.

The invention described herein can be implemented, in accordance with one possible embodiment, as a product in a component in a flex plate utilized in automatic transmission engines. Although described in detail as a possible application, the use of a flex plate in automatic transmission engines should not be viewed as a limitation with respect to the disclosed embodiments, as it will be appreciated that many other industrial and commercial applications are possible. The disclosed embodiment(s) can be configured in the context of a small-sized device, which is also lightweight. Thus, the present invention can be embodied in the context of practical and low cost design solutions. Such designs may include the use of plastic parts and can be mass-produced for automotive, heavy-duty vehicles, and commercial markets with a relatively inexpensive process.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for packaging and mounting an acoustic wave sensor to a flex plate, comprising:
bonding a sense die to a metal disc, wherein said metal disc comprises at least one locating feature formed in said metal disc, wherein said at least one locating feature acts as a locator for placement and orientation of said sense die relative to the flex plate;
attaching an insulator to said metal disc, wherein said insulator comprises a plurality of lead pins for wire bonding to said sense die, wherein said insulator surrounds at least part of a periphery of said sense die; and
aligning said metal disc in association with said sense die to the flex plate by matching said at least one locating feature of said metal disc with at least one corresponding locating feature of a cutout in said flex plate.

2. The method of claim 1 wherein said cutout comprises a circular cutout.

3. The method of claim 1 further comprising bonding a cap over said insulator utilizing an adhesive.

4. The method of claim 3 wherein said sense die is bonded to the metal disc utilizing an adhesive.

5. The method of claim 1 wherein said metal disc comprises sheet metal.

6. The method of claim 1 wherein said sense die comprises a SAW sense die.

7. The method of claim 1 further comprising:
flushing said metal disc and said flex plate; and
locating a weld circle away from said sense die in order to reduce a strain reduction effect due to heat generated during a welding process.

8. The method of claim 1 wherein said metal disc comprises a same material as that utilized to form said flex plate.

9. The method of claim 1 wherein said insulator is made of plastic.

10. The method of claim 1 wherein said cap is made of plastic.

11. The method of claim 1 wherein said plurality of lead pins of said insulator is held in place via a plastic mold.

12. The method of claim 1 wherein said plurality of lead pins is electrically connected to said sense die by a wire-bonding process.

13. The method of claim 1 further comprising determining a torque value transferred through said flex plate by said sense die.

14. A method for packaging and mounting an acoustic wave sensor to a flex plate, comprising:
bonding a sense die to a metal disc, wherein said metal disc comprises at least one locating feature formed in said metal disc, wherein said at least one locating feature acts as a locator for placement and orientation of said sense die relative to the flex plate;
attaching an insulator to said metal disc, wherein said insulator comprises a plurality of lead pins for wire bonding to said sense die, wherein said insulator surrounds at least part of a periphery of said sense die;
bonding a cap over said insulator utilizing an adhesive; and
aligning said metal disc in association with said sense die to the flex plate by matching said at least one locating feature of said metal disc with at least one corresponding locating feature of a cutout in said flex plate.

15. The method of claim 14 wherein said cutout comprises a substantially circular cutout, said metal disc comprises sheet metal, and said sense die comprises a SAW sense die.

16. A system comprising:
a sense die bonded to a metal disc, wherein said metal disc comprises at least one locating feature formed in said metal disc, wherein said at least one locating feature acts as a locator for placement and orientation of said sense die relative to a flex plate;
an insulator attached to said metal disc, wherein said insulator comprises a plurality of lead pins for wire bonding to said sense die, wherein said insulator surrounds at least part of a periphery of said sense die; and
wherein said metal disc is aligned in association with said sense die to the flex plate by matching said at least one locating feature of said metal disc with at least one corresponding locating feature of a cutout in said flex plate.

17. The system of claim 16 further comprising bonding a cap bonded over said insulator via an adhesive, wherein said cutout comprises a circular cutout, said metal disc comprises sheet metal, and said sense die comprises a SAW sense die.

18. The system of claim 16 wherein:
said metal disc and said flex plate are flush with respect to one another; and
a weld circle is located away from said sense die in order to reduce a strain reduction effect due to heat generated during a welding process.

19. The system of claim 16 wherein said metal disc comprises a same material as that utilized to form said flex plate, and said sense die is bonded to said sheet metal disc utilizing an adhesive.

20. The system of claim 16 wherein:
said insulator is made of plastic;
said cap is made of plastic; and
said plurality of lead pins is electrically connected to said sense die by a wire-bonding process.

21. The system of claim 16, wherein an adhesive is used to bond the sense die to the metal disc.

22. The system of claim 21, wherein an adhesive is used to bond the insulator to the metal disc.

23. The system of claim 16, wherein said insulator extends around the entire periphery of said sense die.

* * * * *